Sept. 9, 1941.    J. R. PARSONS    2,255,227
APPARATUS FOR PRODUCING MINERAL WOOL
Filed Nov. 10, 1938    2 Sheets-Sheet 1
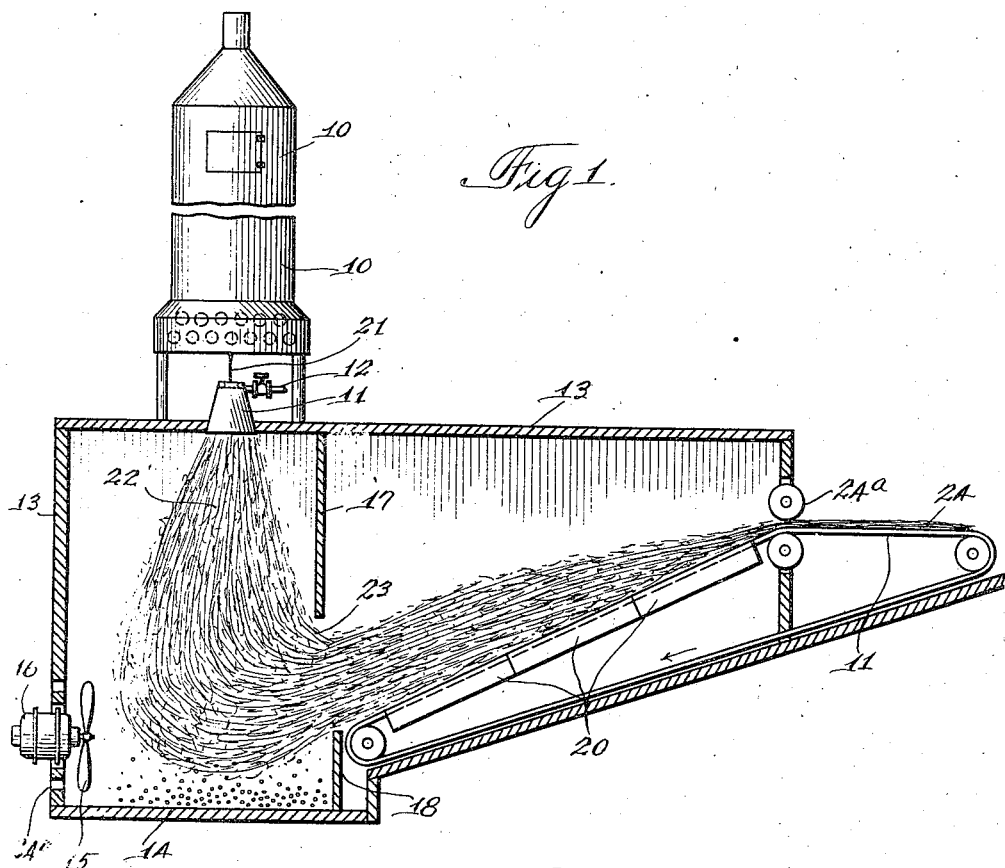
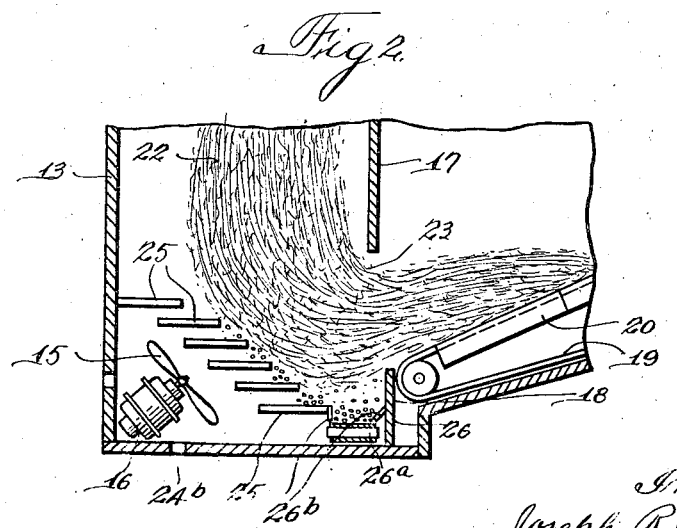
Inventor
Joseph R. Parsons Sept. 9, 1941.                J. R. PARSONS                2,255,227
                    APPARATUS FOR PRODUCING MINERAL WOOL
                      Filed Nov. 10, 1938      2 Sheets-Sheet 2
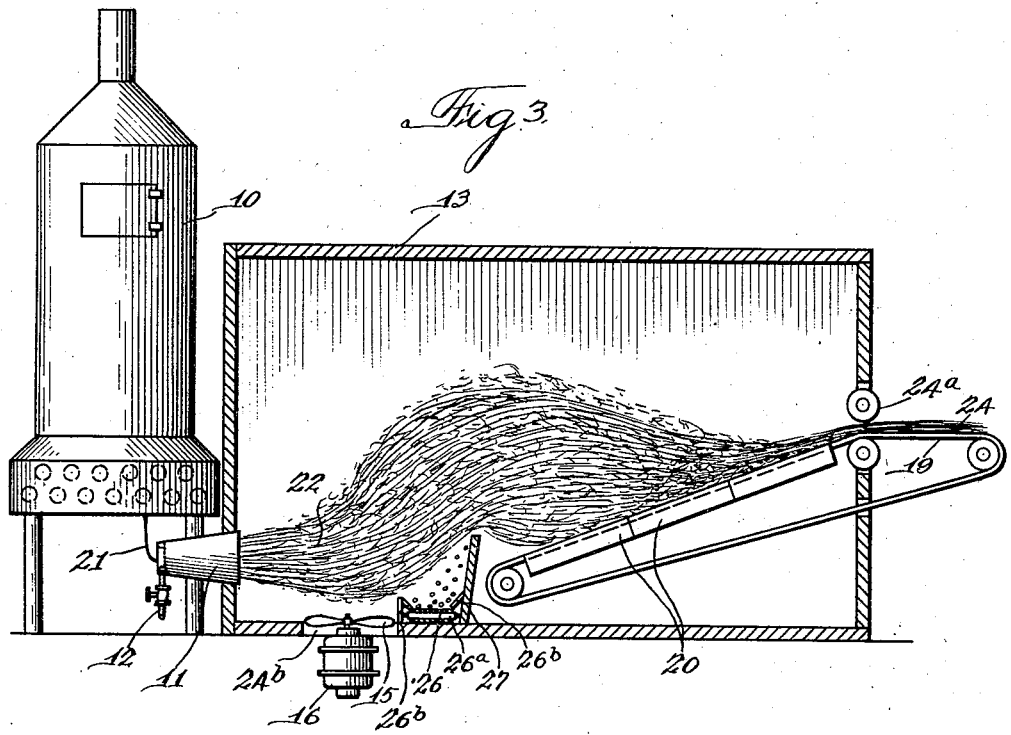
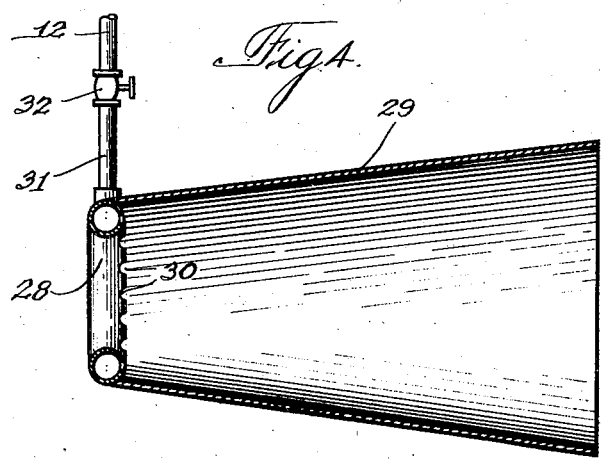
Inventor
Joseph R. Parsons
By Ames, Thiess, Olson & Mecklenburger
Attys.

Patented Sept. 9, 1941

2,255,227

UNITED STATES PATENT OFFICE 2,255,227

APPARATUS FOR PRODUCING MINERAL WOOL

Joseph R. Parsons, Chicago, Ill., assignor to United States Gypsum Company, Chicago, Ill., a corporation of Illinois Application November 10, 1938, Serial No. 239,819

3 Claims. (Cl. 83—91)

This invention relates to an apparatus for producing mineral wool, and has for an object the provision of an apparatus for producing mineral wool comparatively free from shot, beads, or slugs.

At the present time mineral wool is prepared by passing a stream of molten material such as slag or molten rock or glass into a rapidly moving stream of hot air or steam. The molten material is thus blown out into fibers which are collected to form the mineral wool. In the production of this material, however, a large number of shots or slugs are found in the resulting product because of the imperfect drawing out of the molten material into fibers when it is introduced into the gaseous stream.

It is, therefore, one object of this invention to provide a method and apparatus for the production of mineral wool that is substantially free from shots or slugs, the resulting product being useful as an insulation material.

It is a further object of the invention to provide a method and apparatus for separating the shot and slugs from the fibers before the fibers are collected.

Further objects will be apparent in the following description, the drawings, and the appended claims.

Referring now more particularly to the drawings,

Figure 1 is a diagrammatic sectional view of an apparatus that may be employed for producing mineral wool in accordance with one embodiment of this invention;

Fig. 2 is a partial view in section of a modified form of construction indicated in Fig. 1;

Fig. 3 shows another modification of the apparatus for producing mineral wool which may be constructed in accordance with one embodiment of this invention; and Fig. 4 is a sectional view of a nozzle which may be employed for blowing the wool in accordance with one embodiment of this invention.

In the production of the mineral fibers from molten material, the fibers are drawn out in a rapidly moving stream of gas such as steam or hot air. The material is projected into a collecting chamber at a high velocity, and may be allowed to accumulate therein or it may be collected on suitable belt conveyors or the like. It has been found, however, that the molten material may not be completely converted to the fibrous state, and a number of beads may be inadvertently produced during the blowing operation. Certain of the beads may be present in substantially spherical shape, or may be attached directly to a fiber or fibers which have been blown therefrom in order to produce a bead having a trailing tail of fibrous material. It is desirable that these beads or shots be removed from the fibrous mass in order that a lightweight product may be formed in the apparatus. It has been found that, if the fibers are blown from the nozzle toward a target and a current of air is passed transversely across the path of the fibrous material, the fibers will be diverted because of their relatively light mass, and the beads, shot, and heavier material will be blown directly against the target. The fibers attached to the beads will be broken off when the beads hit the target, and the transverse current of air may be so directed as to blow those fibers with the others. The beads, shot, or slugs may then be removed from, or drop to the base of, the target, since they are too heavy to be lifted by the air current. The fibers and beads may then be collected separately by any suitable means such as a conveyor belt in a chamber.

In accordance with one preferred embodiment of this invention, it has been found desirable to employ a nozzle for blowing the molten material into the fibrous state which comprises a ring-shaped member from which the gas or steam may be emitted and through the center of which the molten material issuing from the melting cupola may be introduced or drawn. A suitable bell-like member is provided in order to direct the blown fibers against the target and also to permit a more complete mixing of the molten stream with the rapidly moving gaseous stream. A nozzle of this description pulls the molten material almost completely into the fibrous condition with a minimum amount of slug and shot formation.

In order that a more complete understanding of this invention may be had, more specific reference will now be made to the drawings, wherein are diagrammatically shown several types of apparatus which may be employed in accordance with this invention.

Referring now more particularly to Fig. 1, the apparatus for producing mineral wool in accordance with this embodiment comprises a suitable cupola or furnace 10, a blower nozzle 11 connected to a suitable steam or air supply 12, and a collecting chamber 13 for the fibrous material. The floor 14 of the collecting chamber 13 provides a suitable target against which the fibrous material issuing from the nozzle 11 may be impinged. A blower means comprising an air impeller or fan 15 which may be operated by any suitable means such as a motor 16 is provided adjacent the target. The collecting chamber 13 may be divided into two parts by means of the partitions 17 and 18. A belt conveyor 19 may be provided in the portion of the collecting chamber 13 opposite that portion which contains the target 14. The belt conveyor may be inclined and provided with suitable suction boxes 20 in order that the fibers collected in the chamber may be more readily deposited on the conveying means. The side walls of the portion of the chamber 13 within which the belt 19 is positioned may be slanted (not shown), so that any material introduced into that portion will be directed to the belt 19.

In the operation of the apparatus described above, a molten stream 21 may be caused to flow from the cupola 10 through the nozzle 11 according to the conventional practice and as will be hereinafter more fully described. Air or steam is also passed into the nozzle and the molten material is thereby drawn out into a fine fibrous condition. The fibers 22, which may contain some beads, shot, or slugs, are thereby introduced into the chamber 13 at a high velocity. The speed of the light fibrous material, however, drops off rapidly due to the resistance of the air, while the beads having a more compact mass maintain their velocity and are projected to the floor 14 of the chamber 13. The relatively slowly moving fibers are blown by a blast of air from the fan 15 onto the conveyor 20 on the opposite sides of the partitions 17 and 18. The air current is so directed that substantially all of the light-weight fibrous material, without the beads or shot, is directed through the opening 23 between the partitions 17 and 18, whereby the fibrous material 22 falls onto the endless belt conveyor 19. Sloping side walls (not shown) in the chamber direct the settling fibrous material to the surface of the belt. Suction applied to the suction boxes 20 through the belt 19, which may be perforated, permits the fibrous material to be firmly compacted. The fibers are thus removed from the collecting chamber 13 in the form of a continuous mineral wool bat 24. A roller 24a may also be provided which may be employed to compress the formed mineral wool bat to the desired thickness and density. Holes 24b are provided in the sides of the chamber 13 behind the fan 15 in order to permit entrance of the air blown by the fan.

It will be observed that, when the beads or shot having fibers attached thereto are impinged against the target 14, the fibers will have a tendency to become broken away from the heavier particles and the fibers may then be picked up by the air current produced by the fan 15 and deposited on the conveyor belt 19. The beads may be removed from the face of the target 14 intermittently or continuously in any desired manner.

In accordance with a further modification of this invention, the target against which the fibrous material is directed may comprise a series of plates 25 as is indicated in Fig. 2. These plates may be arranged in stepped relationship to each other in the manner indicated in the drawing and the fan 15 placed thereunder. The air current is thus directed between the plates 25 to the descending stream of fibers. It will be observed that the beads and shot striking the plates from the fibrous stream, being heavier than the fibers, will descend from step to step and finally collect in the space 26, from which they may be removed by any suitable means such as a conveyor belt 26a. Suitable plates 26b may be provided to guide the beads onto the conveyor 26a from the space 26. In this embodiment the fan likewise directs the air current through the opening 23 between the partitions 17 and 18, whereby the fibers are carried to the conveyor belt 19.

In accordance with a further modification of this invention, the molten material and fibers may be introduced transversely into the collecting chamber 13 in the manner indicated in Fig. 3. The molten material passes from the cupola 10 through the nozzle 11, where it is converted to fibers which are directed in a stream toward the target 27, which may extend substantially vertically from the floor of the collecting chamber 13. In this modification the fan or air current producing means 15 may be positioned in the bottom of the collecting chamber 13 whereby the transverse air current directs the fibers over the target 27 and are finally permitted to settle on the conveyor belt 19. The shot collecting at the base of the target 27 may, if desired, be removed intermittently or continuously by any desired means, such as the conveyor belt 26a.

It will thus be understood that the beads or shot are removed from the mineral wool previous to the time of collecting, due to the relative masses and velocities with which they are projected from the nozzle into the collecting chamber. The path of the lighter fibrous material is readily diverted and may be collected separately from the heavier particles.

It will be understood that any type of nozzle may be employed for blowing the mineral wool in accordance with this invention. It has been found desirable, however, to employ a nozzle having a structure indicated in detail in Fig. 4. This nozzle comprises a hollow ring 28 to which may be attached a substantially bell-shaped member 29. The bell-shaped member 29 permits the stream of fibrous material to be spread into a fan-like shape before it is contacted with the separating stream of air. The ring 28 may be a hollow pipe and may contain a plurality of perforations 30 directed toward the inside of the bell portion. The hollow ring is connected by a suitable steam or air pipe 31. A valve 32 may be provided for regulating the amount of gas or steam introduced into the nozzle.

In order to produce the mineral wool fibers with the nozzle constructed in accordance with this invention, the molten material may be introduced through the hole formed by the ring 28, while a stream of air or steam is introduced into the bell-shaped form from the perforations 30 at high velocities. The high velocity of the steam passing into the bell portion 29 will cause the molten material to be sucked through the hole formed by the ring 28 and into the bell wherein the melt is drawn out into fine fibers by means of the rapidly moving stream of air or steam. Thus, as has been indicated in Fig. 3, it has been found that a stream of molten material, falling behind the nozzle and at right angles to it, close to the opening 28, will be completely sucked therethrough because of the high velocity of the gases passing into the bell 29 from the holes or perforations 30 in the ring 28. The perforations may be "rifled" if desired to provide a swirl to the stream of gases escaping therefrom. Also, the perforations 30 in the ring 28 may, if desired, be substituted by a continuous or discontinuous slit extending around that portion of the ring facing the bell portion 29.

In the Venturi type blowing nozzle described above, it is desirable that the smaller end of the cone or bell be positioned adjacent the blower ring and that the larger end be of sufficient diameter to permit a streamlined flow of gas or steam. The larger end may be of a diameter to permit the maximum expansion that the steam is capable of assuming at the distance the larger end is located from the blower ring. One preferred type may have an overall length of twelve inches and a diameter of twelve inches at its larger end. The converging action of the streams of gas within the bell permits the melt introduced into the nozzle to be subjected to a stirring and expanding action which increases the degree of fiberization of the melt. The expanding action of the bell is desirable, since the velocity of the fibers being projected therefrom is decreased and the direction of travel of the fibers may be more readily altered by the blast of air from the fan 15.

It is not intended, however, that this invention be limited to a nozzle having a bell-shaped member in the form of a truncated cone as shown in the drawings. If desired, the bell may be substantially cylindrical, may have flaring side walls, or be non-circular in cross section. Under certain conditions the bell-shaped member may be eliminated from the nozzle, or other types of nozzles that are well known to the art may be employed.

It will be observed that a method and apparatus has been described in the foregoing which may be employed for the production of a mineral wool that is substantially free of beads. It may be produced continuously in the form of bats of the type now in extensive use as insulating material.

While several particular embodiments of this invention are shown above, it will be understood, of course, that the invention is not to be limited thereto, since many modifications may be made, and it is contemplated, therefore, to cover any such modifications as fall within the true spirit and scope of this invention as defined by the appended claims.

I claim:

1. An apparatus for producing a substantially bead-free mineral wool from a stream of molten mineral material, having a means for disintegrating said stream to the fibrous condition, a fiber collecting means, a separating means for substantially complete removal of the beads from the fibers, and a bead collecting means, said stream disintegrating means comprising a nozzle which comprises a bell-shaped member open at either end, a hollow ring member adjacent one end of said bell shaped member, gas introducing means for said hollow ring member, and holes in said hollow ring member, said holes being positioned to direct gas from the hollow ring member to the inside portions of said bell in a direction initially substantially perpendicular to the plane of said ring member.

2. An apparatus for separating beads from mineral wool fibers integrally attached thereto which comprises an unconfined open chamber, means adjacent the top of said chamber for projecting a gaseous suspension of said fibers and said beads downwardly into said open chamber at relatively high velocity, a target including a plurality of spaced plates positioned in stepped relationship positioned adjacent the bottom of said chamber against which said suspension is projected, gaseous-current-producing means positioned behind said target and adapted to force a current of gas between said plates and substantially horizontally across the path of movement of said suspension and the face of said target whereby the direction of motion of the fibers in the gaseous suspension is diverted but the direction of motion of the heavier beads remains substantially unaltered and whereby the fibers shattered from the beads on the target are separated from the beads, and separate collecting means for the beads and the fibers.

3. An apparatus for separating beads from mineral wool fibers integrally attached thereto which comprises an unconfined open chamber, means associated with said chamber for projecting a gaseous suspension of said fibers and said beads thereinto at relatively high velocity, a target including a plurality of spaced plates positioned in stepped relationship extending at substantially right angles to the direction of motion of said suspension against which said suspension is projected, gaseous-current-producing means positioned behind said target and adapted to force a current of gas between said plates and across the path of movement of said suspension and across the face of said target whereby the direction of motion of the fibers in the gaseous suspension is diverted but the direction of motion of the heavier beads remains substantially unaltered and whereby the fibers shattered from the beads on the target are separated from the beads, and separate collecting means for the beads and the fibers.

JOSEPH R. PARSONS.